United States Patent Office 3,445,841
Patented May 20, 1969

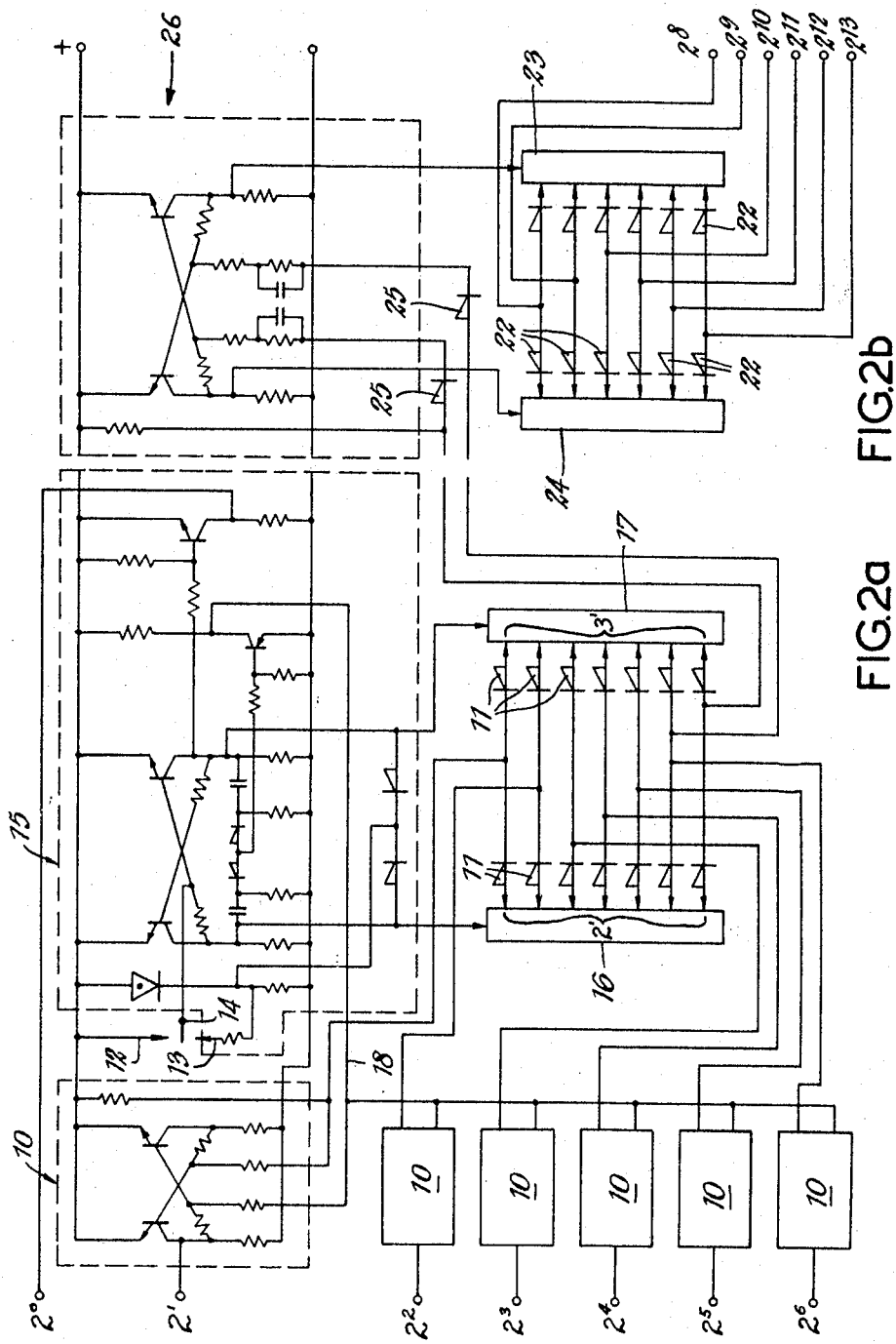

3,445,841
CONTACT ENCODER WITH ERRONEOUS READ-OUT PREVENTION CIRCUITRY
Noel P. Parkinson, 15 Eagle Road, Wembley, Middlesex, England
Filed June 7, 1965, Ser. No. 461,786
Claims priority, application Great Britain, June 9, 1964, 23,841/64
Int. Cl. H04l 3/02; H03k 13/34
U.S. Cl. 340—347         12 Claims

ABSTRACT OF THE DISCLOSURE

The contact encoder has two groups of digital read-out contact wipers, for example either angularly spaced and cooperating with a single group of contacts on a disc, or cooperating with two respective groups of said contacts. Control contacts on the disc are utilized to initiate readout from different groups of wipers in accordance with the relative position of the disc and the wipers, and all the output circuits associated with the wipers are reset automatically in a common stable state before readout is initiated, each output circuit being latched into a further stable state only when a readout is supplied thereto from the respective wiper.

---

The invention relates to contact-carrying encoders.

It is an object of the invention to provide an encoder of the disc, drum or other contact-carrying type providing an at least substantially noise free output.

When examining the layout of a contact encoder of the disc-type, for example it will be apparent that the maximum bit length is obtained at the periphery of the disc. If, therefore, the brushes that can be placed near this periphery are used to control the accuracy of the complete output and ensure its noise free output, then a greatly improved contact encoder will result.

The invention accordingly provides an encoder having a contact-carrying member movable relative to contact-reading means, the contacts carried by the member including contacts at the portion of the member affording maximum bit length, and circuit means including the contacts at said portion and the means reading said contacts for producing at least substantially noise free output from the encoder.

The invention also provides a contact encoder comprising a movable member having thereon one or more series of digitising contact formations and a series of contact elements at the region of maximum periphery, a means operable to complete or interrupt a circuit including a collector for the digitising contact formation under control of the contact elements.

The means operable to complete or interrupt the collector circuit can comprise a trigger switch circuit interposed in the collector circuit, the collector circuit being completed when the trigger switch circuit is one condition of control and interrupted when the trigger switch circuit is in another condition of control.

The invention further provides a disc-type encoder having first and second sets of digitising formations respectively leading and lagging with respect to a series of contact elements nearer the periphery of the disc than the digitising formations, first and second circuits including collectors for the first and second digitising formations respectively and means controlled by the series of contact elements for rendering the collector circuit effective alternately.

The means controlled by the series of contact elements can then comprise a trigger switch circuit arranged in one stable condition to supply an output to the first collector and not to the second collector and in another stable condition to supply an output to the second collector and not to the first collector.

The invention will be more readily understood from the following description and accompanying drawings which are given by way of illustration only.

In the drawings:

FIGURES 1(a) and (b) show the contact track pattern and the brush arrangement for reading it, respectively, of a first encoder disc embodying the invention, and of an auxiliary disc which can be used therewith;

FIGURES 2(a) and (b) are respectively a circuit diagram of the encoder, partly in block form, and a like diagram of an addition thereto for use when the encoder is enlarged by use of the auxiliary disc of FIGURE 1(b);

Figure 1A:
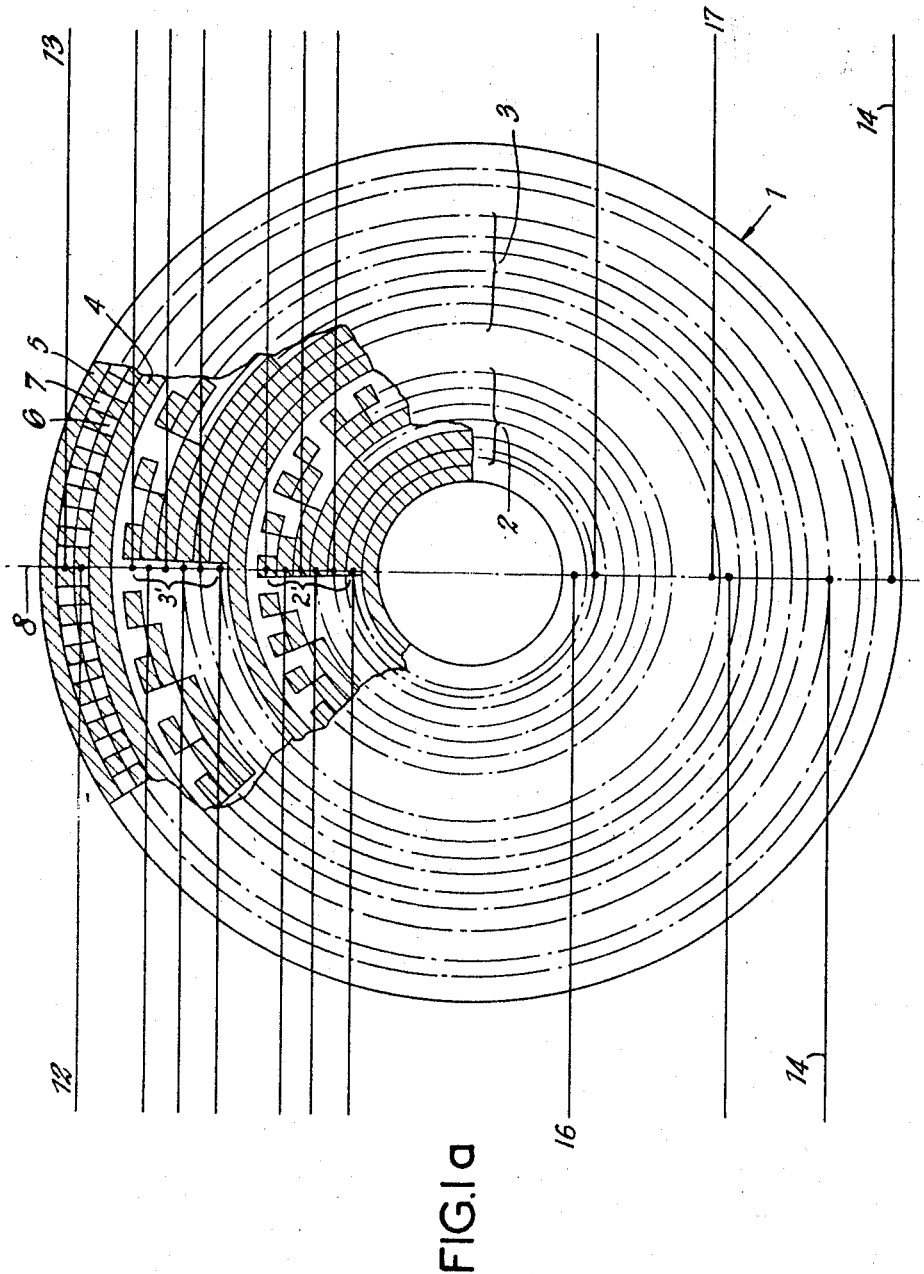

The contact track pattern and the relative disposition of the brushes of an encoder disc 1 are shown in FIGURE 1(a).

It will be seen that the disc 1 is of $2^7$ form and provides two inner sets of tracks 2, 3, constituting digitising contact formations. Outwardly of the series of tracks 2, 3, are provided further contact elements comprising conductive tracks 4, 5 with tracks 6, 7 between them of alternated conductive and insulating portions, the tracks 6, 7 being relatively staggered by the length of one portion. Moreover, the two inner sets of tracks 2, 3, are staggered with respect to the two outer tracks 6, 7, one set being pitched ½ bit length lagging to the two tracks of the outer set, and the other set of tracks leading by ½ bit. Respective brushes 2', 3', 12, 13 for engaging the tracks, 2, 3, 6, 7 respectively are located on a single radial line 8.

The disc shown in FIGURE 1(a) is connected to a circuit as shown in FIGURE 2(a). The circuit shows connection from the brushes in engagement with the track series 2, 3 to line output trigger circuits 10 through rectifying diodes 11. Switch contacts 12, 13, in the circuit represent the brushes so numbered on line 8 engaging respectively tracks 6 and 7, and switch contact 14 represents the brushes 2', 3' engaging tracks 4 and 5. It will be seen that closure of either the contacts 12 or 13 with contact 14 will supply a voltage to a trigger circuit 15, connected in the circuit so as to effect connection of a voltage to either one of collectors 16, 17 associated respectively with the track series 2 and 3.

Assume that the encoder is in a state of rest and that the supply line has just been connected. Due to the closure of contacts 12, 14, a positive voltage is applied to the input of the trigger switch circuit 15 which ensures that the circuit is driven to one of its stable state conditions, herein referred to as state 1. The output of the circuit 15 cannot then change state until a negative signal is applied to the input. The output from the trigger switch circuit 15 is fed to the collector 17, but no output is applied to collector 16. Thus, only the brushes connected with the collector 17 can provide an output through their diodes 11 to the line output trigger circuits 10.

As the trigger switch circuit 15 undergoes the change to its state 1, but before it applies the output to the collector 17, it also applies a voltage to a reset line 18, as appears from FIGURE 2(a), thereby resetting all the line output trigger circuits 10 to the 0 state or off position. Those circuits 10 which have an input when the output is applied to collector 17 due to their associated brushes 3' making contact with a metallic portion of the pattern will lach into the 1 state or on position. Those line output circuits 10 which have no input voltage, because their associated brushes are on an insulated portion of the track, are automatically left in the 0 state or off position because of their design.

If the encoder shaft is now rotated to rotate disc 1 relative to the brushes 3', no change of output will occur, even if brush bounce occurs on any or all of the brushes, until such time as the contacts 12, 14 become open circuit when brush 12 contacts an insulated portion of track 6 and contacts 13, 14 become short circuit when brush 13 contacts a conductive portion of track 7. When this happens, a negative voltage is applied to the input of the trigger switch circuit 15 which causes the circuit to change state and assume its other stable condition, the 0 state.

An output is then applied to the collector 16, but no output appears on collector 17. A voltage is again applied also to the reset line 18, thus ensuring that all line output trigger circuits 10 are set to 0 state outputs, those having an input voltage due to their associated brushes making contact with a metallic portion of the track being latched on to a 1 state due to an output voltage via their series of diodes 11. Again, those line output trigger circuits 10 which have no input voltage are left in their 0 state.

Instead of applying a voltage from the trigger switch circuit 15 to the output circuits 10 via the reset line 18, the trigger switch circuit outputs to the collectors 16, 17 can be taken through diodes to provide the HT line for line output circuits so that the trigger switch circuit output will latch onto those output circuits with an input from the associated brush, whilst those without such an input will be automatically biased to the off position.

During the process of changing state a period occurs when both the 0 and 1 outputs of the trigger circuit are at zero voltage, thus removing not only the input voltages to the line output circuits 10 but also pulsing the reset line 18. This ensures that all the line output circuits 10 are momentarily turned to the 0 output state, that is, are turned off.

Figure 3:
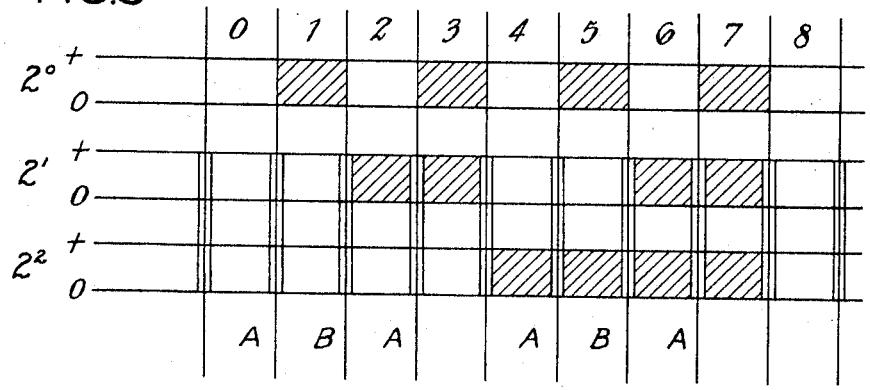
FIGURE 3 shows a portion of a linear track in binary code.

FIGURE 3 shows a portion of the binary code pattern and it can be seen from this that removal of output on the high value outputs will result in pulses which can be gated out. Thus it will be noted that a change of state from zero to full volts only occurs on the $2^1$ output at positions marked A. No other lines change at these positions and the cessation of output due to removal of HT from the output circuits of the $2^2$, $2^3$ and like lines is unnecessary and can be gated out to improve the reliability of operation. Similarly, operation is improved if "off" changes at the B positions are gated out of the $2^3$ and like lines. As will be evident, standard gating logic circuiting can be employed for this purpose.

Figure 1B:
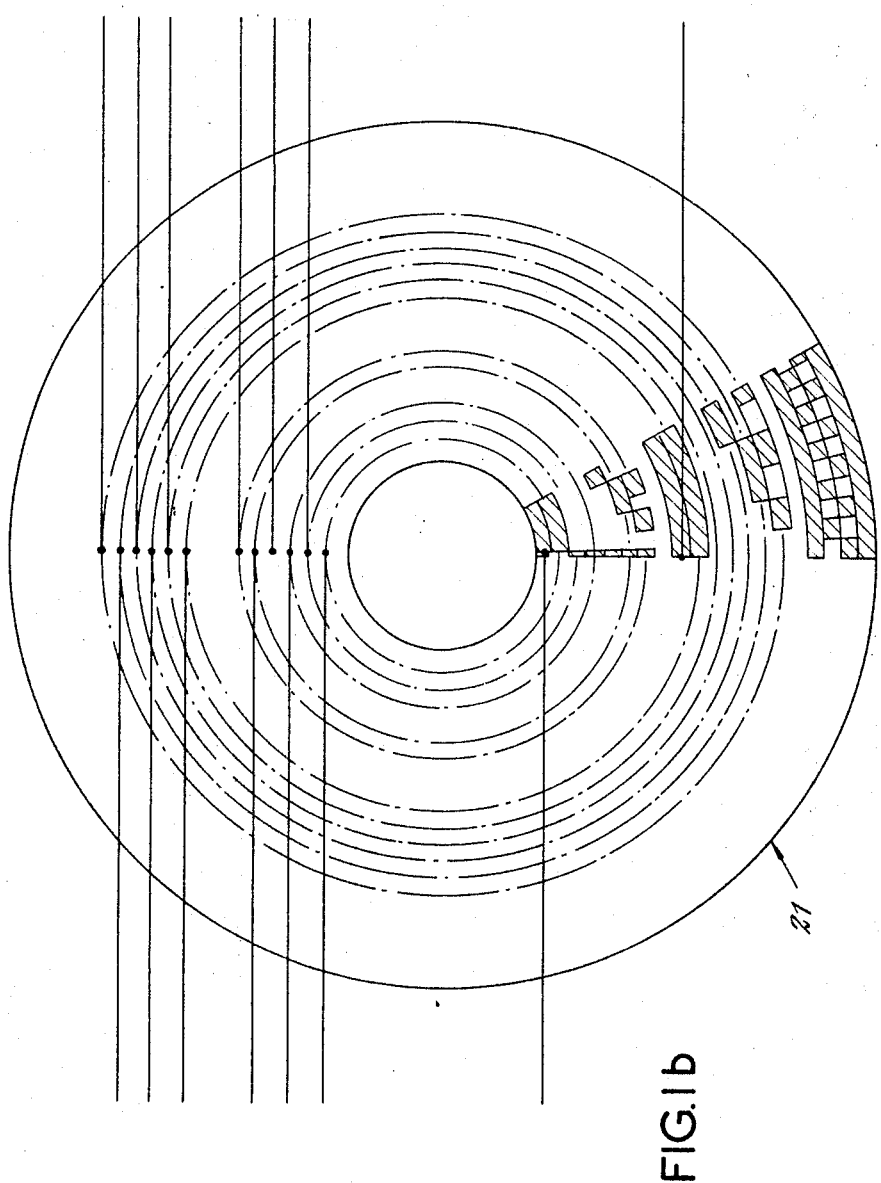

The circuit of FIGURE 2(b) is analogous to that of FIGURE 2(a) and is applicable to enlargement of the scope of the encoder from $2^7$ to $2^{13}$ by the provision of a second low speed disc 21, as shown in FIGURE 1(b), which is precision geared to the first disc 1. In the circuit of FIGURE 2(b), the reading brush outputs are taken by way of diodes 22 directly to line output terminals.

Line output circuits corresponding to circuits 10 could however be provided in the circuit of FIGURE 2(b) and the HT or reset line 18 would then be extended to these line output circuits.

To provide a non-ambiguous output from the disc 21, of FIGURE 1(b), the associated collectors 23, 24 are fed through diodes 25 from brushes contacting the most significant tracks on the disc 1, of FIGURE 1(a), as shown in FIGURE 2(b), thus providing the same type of alternating supply to the reading brushes. Another switch trigger circuit 26, or an amplifier, is included between the diodes 25 and the collectors 23, 24 to prevent electrical loading of the brushes of the disc 1.

Figure 4:
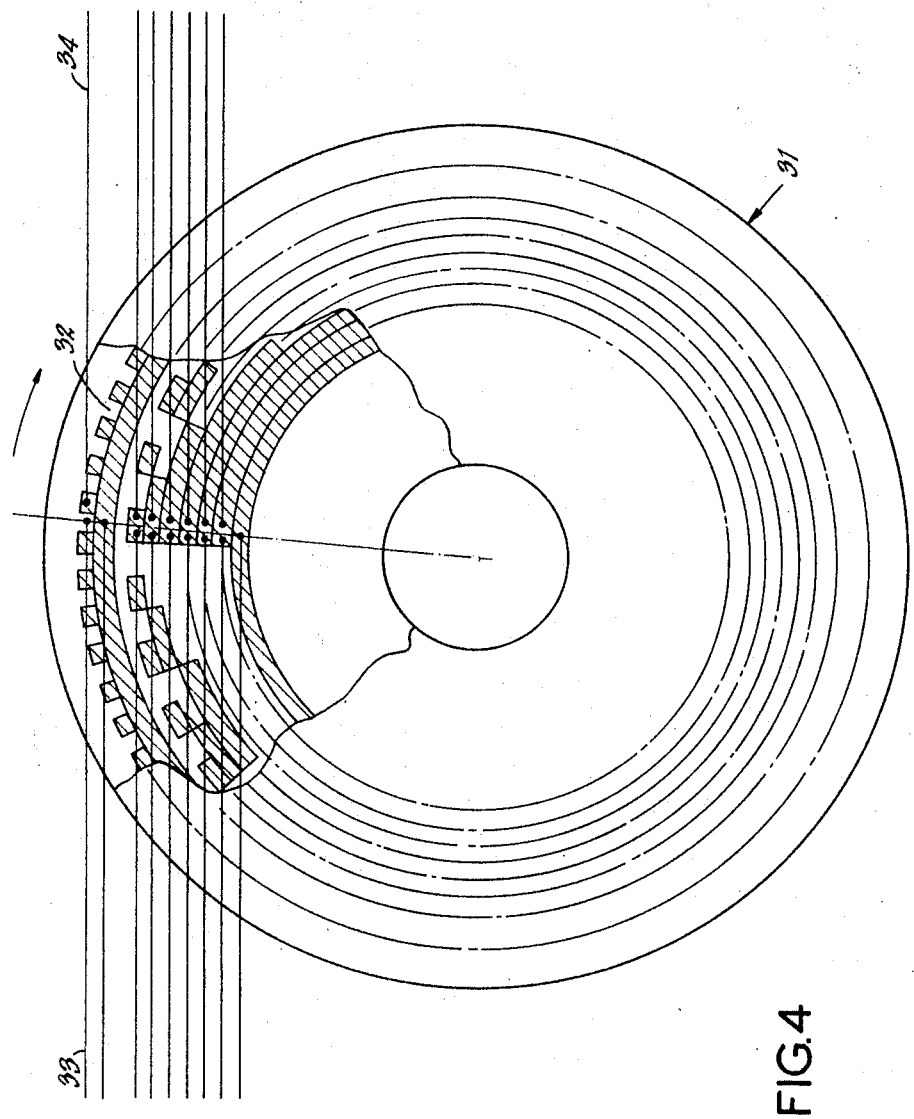
FIGURE 4 shows the contact track pattern of a second encoder disc embodying the invention.

In an alternative arrangement, as shown in FIGURE 4, in place of the radially aligned brushes 12–14 and the two separate tracks 6 and 7 on the disc, only a single such track 32 is provided on a disc 31 for co-operation with a pair of brushes 33 and 34 staggered apart by one bit length. It will be apparent that the same control functions can be exercised by the staggered brushes 33 and 34 as by the aligned brushes 12 and 13, less space however being occupied on the disc.

Figure 5:
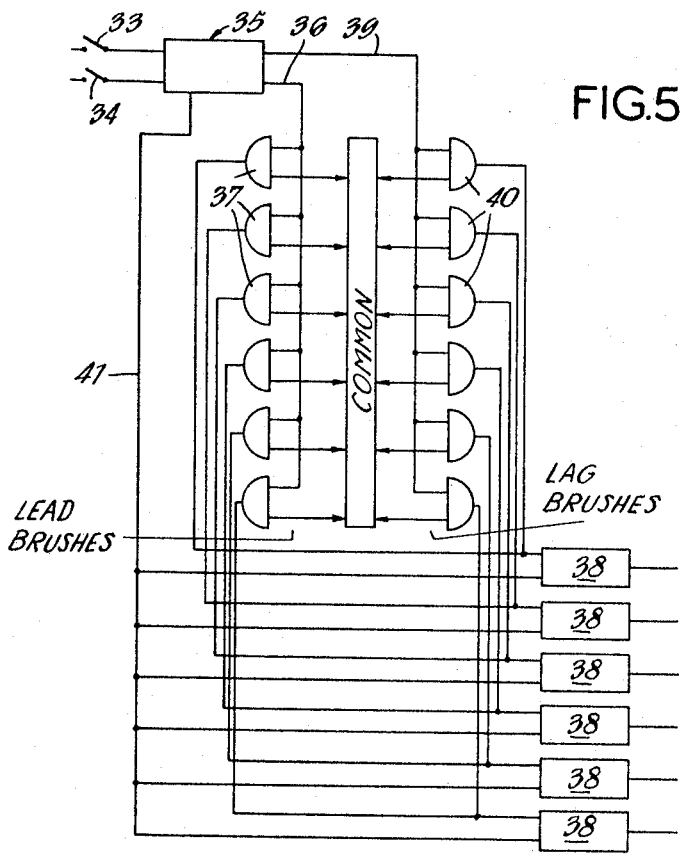
FIGURE 5 shows the circuitry for use with the disc of FIGURE 4.

As shown in FIGURE 5, circuitry is provided for deciding which of the lead and lug brush outputs is to be read by the use of AND gates. When the brush 33 applies a voltage to a flip-flop 35, corresponding to the flip-flop 15 of FIGURE 2(a), this provides an output on connector 36 from one side which is AND gated in AND gates 37 with the lead brush outputs to be then fed to output circuits 38 through summing diodes, if these are required. The output circuits 38 can be supplied with a voltage from the trigger circuit 35 through reset line 41, corresponding to reset line 18 of FIGURE 2(a). The lagging set of brushes is read when a voltage is supplied to the flip-flop brush 34 so as to cause its opposite output on connector 39 to be AND gated in AND gates 40 with these outputs.

It will be apparent that the output trigger circuits or flip-flops can be interconnected so as to act as a shift register. By supplying a chain of pulses, serial readout of the encoder over a pair of wires can then be obtained.

The circuit arrangements described can be varied by replacing each line output circuit by an AND gate and an inverter. This can result in economy, and the noise free output signal due to the trigger switch circuit or flip-flop 15 is still obtained.

It will be appreciated that although transistors are very suitable for use in the trigger switch circuits, other circuit elements such as trigistors, unijunction diodes or signal controlled rectifiers may be used in appropriate circuitry.

The invention can of course be embodied in a variety of ways other than those specifically described, in particular, in drum-type encoders instead of disc-type encoders; the scope of the invention is therefore as defined by the following claims. However embodied, it will be apparent that the invention provides an advantageously noise free encoder.

What I claim and desire to secure by Letters Patent of the United States is:

1. A contact encoder comprising:
    a contact-carrying member having at least one group of coded contact tracks thereon,
    two groups of contact brushes associated with said tracks, the contact-carrying member being movable relative to said brushes so that the brushes provide different digital outputs at different relative positions of the contact-carrying member and the brushes,
    respective output circuits connected to the contact brushes,
    control contacts on said contact-carrying member,
    a control circuit associated with said control contacts and effective to initiate readout from different respective groups of contact brushes in accordance with the relative position of the contact-carrying member and the brushes,
    resetting means controlled by said control circuit and effective to set all the output circuits into a common stable state before readout is initiated, and
    means effective to change each respective output circuit into and latch said circuit in a further stable state only when a readout is supplied thereto from the respective contact brush.

2. An encoder as claimed in claim 1, in which the control contacts are provided in a portion of the contact-carrying member which provides maximum displacement for a given relative movement of the member.

3. An encoder as claimed in claim 2, in which the said member is rotatable about a fixed axis, the control contacts being disposed at the region of maximum periphery of the member.

4. An encoder as claimed in claim 1, in which the control circuit comprises a bistable trigger circuit including two respective collectors for supplying current to two respective said contact groups, the circuit to one group being completed when the trigger circuit is one condition of control, and the circuit to the other group being completed when the trigger switch circuit is in the other condition of control.

5. An encoder as claimed in claim 4, in which said two contact groups comprise first and second sets of digitising contact formations respectively leading and lagging with respect to the control contacts, the control circuit being operative on rotation of the contact-carrying member to initiate readout from the first and second digitising formations alternately.

6. An encoder as claimed in claim 3, including a second rotatable contact-carrying member having like contact tracks thereon and rotatable at a fixed speed relative to the first said member.

7. An encoder as claimed in claim 6, in which brushes for supplying current to the second member are fed from contact elements contacting the most significant contact formations of the first member.

8. An encoder as claimed in claim 5, in which the respective contact elements are connected to the respective output circuits through respective AND gates the opening and closing of which is controlled by the said control circuit.

9. An encoder as claimed in claim 8, in which each output circuit is arranged to be latched into said stable state by an output from any contact element contacting a conductive portion of a track of the digitising contact formation.

10. An encoder as claimed in claim 9, in which each output circuit provides an output when the associated brush has a voltage thereon, and provides no output when the brush has no voltage thereon.

11. An encoder as claimed in claim 1, in which the control contacts comprise a pair of tracks of alternate conductive and non-conductive portions staggered by the length of one portion, the brushes being disposed on a common line crossing said tracks.

12. An encoder as claimed in claim 1, comprising a single group of contacts comprising tracks of alternate conductive and non-conductive portions, and including two groups of brushes staggered by the length of one portion.

References Cited

UNITED STATES PATENTS

| | | | |
|---|---|---|---|
| 3,286,251 | 10/1966 | Byun et al. | 340—347 |
| 3,025,511 | 3/1962 | Orrange | 340—347 |
| 3,024,990 | 3/1962 | Magnuson | 235—154 XR |
| 2,866,184 | 12/1958 | Gray | 340—347 |

MAYNARD R. WILBUR, *Primary Examiner.*

C. D. MILLER, *Assistant Examiner.*